Figure 4:
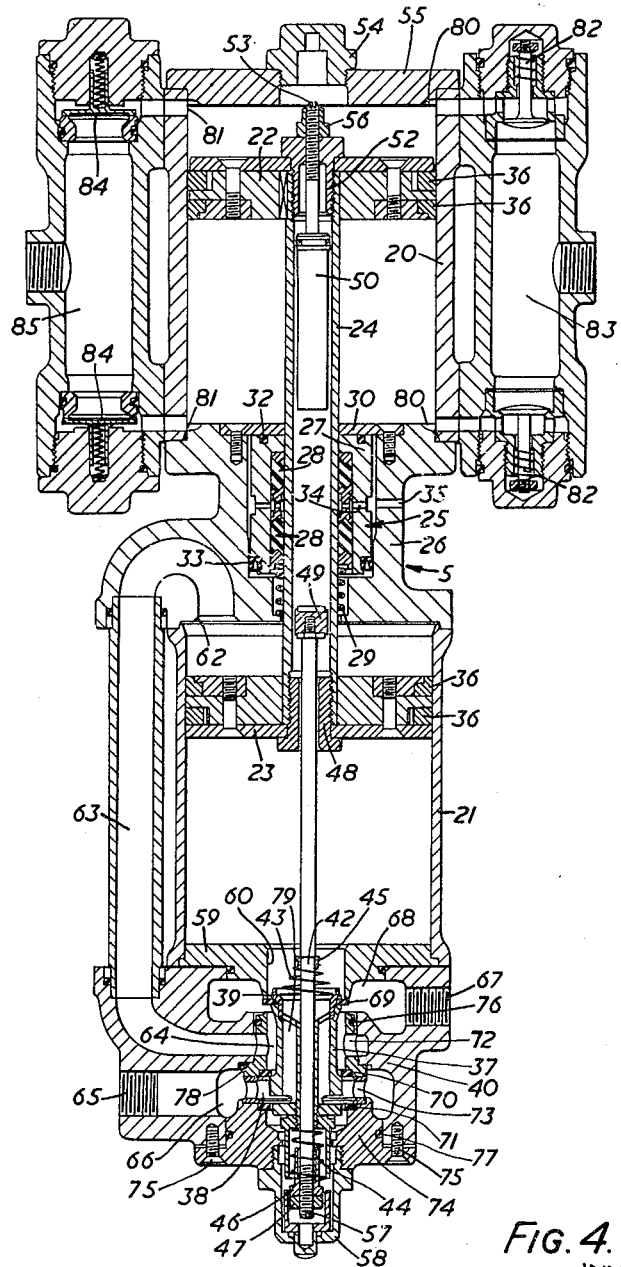

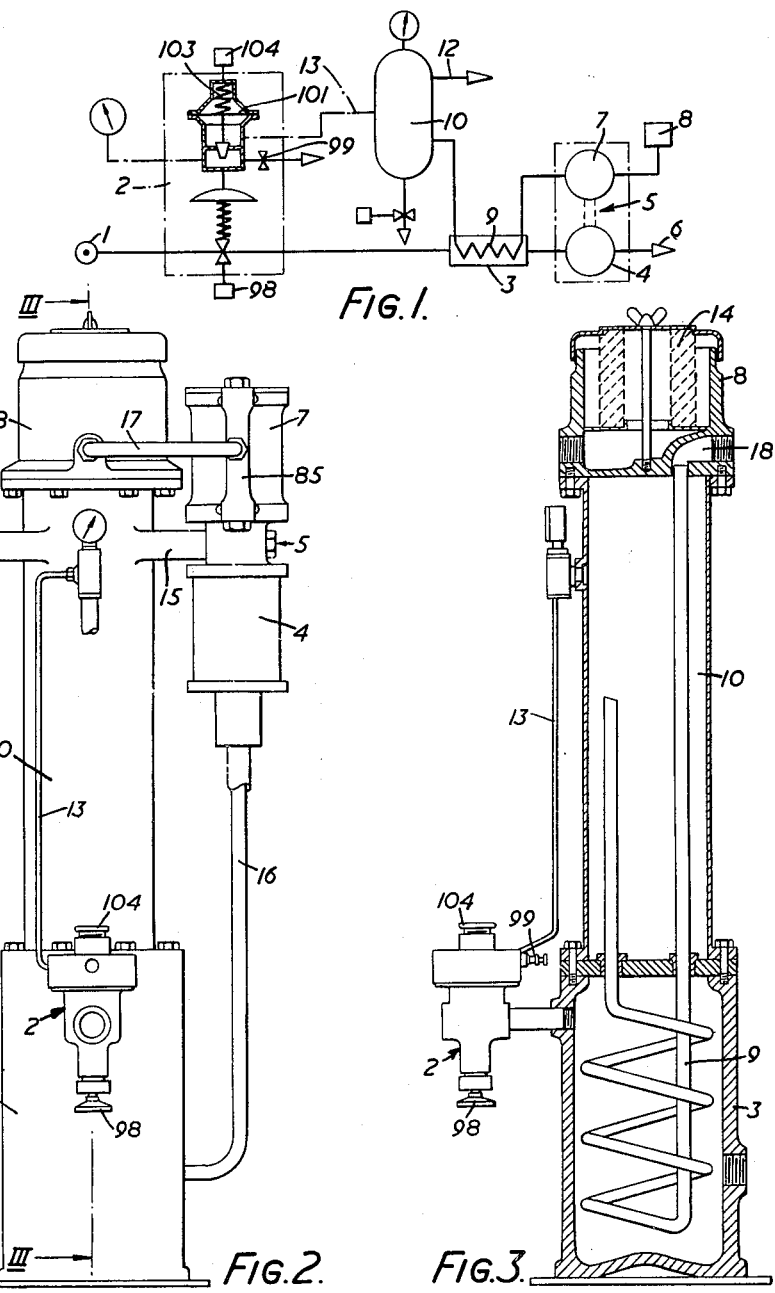

INVENTOR
DAVID RICHARD JAMES
BY
Irwin S. Thompson
ATTORNEY

United States Patent Office 3,205,786
Patented Sept. 14, 1965

3,205,786
FLUID-PRESSURE OPERATED EQUIPMENT AND METHODS OF UTILISING SUCH EQUIPMENT
David Richard James, Covertside, Hasfield, England, assignor to Williams & James (Oil Tools) Limited, Gloucester, England
Filed May 10, 1963, Ser. No. 279,497
17 Claims. (Cl. 91—342)

This invention relates to fluid-pressure operated equipment, and in particular to a method of utilising such equipment in a manner which employs a fluid under pressure to provide another and gaseous fluid under pressure. The invention is also concerned with equipment for use in such a method, the provision of a fluid-pressure operated motor of reciprocating type with improved valve means and the provision of a combined reciprocating motor and compressor unit with improved means of stroke limitation.

It is at times desired to employ a contaminated gaseous fluid under pressure to provide the energy to supply a further gaseous fluid under pressure in circumstances where no other source of energy is readily or suitably available. An example of such a circumstance is at an oil well in a remote area where compressed air is desirable to operate pneumatic well instrumentation and a supply of sour petroleum gas from the well is readily available under pressure. Such gas is at present often supplied directly to the instruments, but the contamination of the gas rapidly corrodes the instruments so that excessive maintenance and replacement thereof is necessary. At such a situation separate sources of power such as an electricity supply are not available, and it is essential to use equipment which does not require day-to-day maintenance or the presence of operating personnel.

When a fluid-pressure operated motor has to be used in remote situations, it is desirable that it should be able to be operated continuously for long periods without the need for regular maintenance, and one object of the invention is to provide a reciprocating-type motor with new or improved control valve means which can be constructed to operate continuously for very long periods without regular inspection or maintenance. To this end, according to a second feature of the invention, a fluid-pressure operated reciprocating motor employs control valve means of poppet type comprising a valve member with two spaced poppet portions each movable between two opposed seatings against which the portion alternatively seats, both poppet portions seating together to control the inlet and exhaust of the motor.

The effective area of the two seatings associated with one of the poppet portions is preferably different than the effective cross-section of the two seatings associated with the other poppet portion, so that in use a pressure differential is produced which biases the valve member. The flow through the valve may be so arranged that in each terminal position of the valve member the differential bias urges it to and retains it in that position until the valve changes-over at or near the end of the corresponding motor stroke. The valve may be changed-over mechanially, and the valve operating force may be applied through a spring the compression of which is sufficient to move the valve member against said bias and to hold it in the new terminal position until the pressure conditions have built up the necessary bias in the opposite direction.

A bias for the valve member may be provided in other ways, for example magnetically. In this case a permanent magnet or magnets may be provided in the valve construction to cooperate with, and be attracted by, a ferro-magnetic component or components. The magnetic attraction is arranged to be a maximum at each terminal position of the valve member and preferably a minimum air gap is provided to ensure satisfactory valve sealing, particularly when using resilient valve rings as later described. Such a magnetic arrangement is preferable to a mechanical valve latching device as it is not subject to wear.

In each terminal position the valve member has to seat against two separate seatings, and to enable this to be achieved efficiently and reliably, resilient valve sealing rings may be used, preferably with each poppet portion. Conveniently one poppet portion has two resilient rings for engagement respectively with the two associated seatings and the other two seatings are provided with resilient rings for sealing engagement with the other poppet portion. Any bias applied to the valve member should be sufficient to deform the resilient rings sufficiently to provide a satisfactory seal of both poppet portions simultaneously.

With a combined motor and compressor unit of the free-piston reciprocating type it is often difficult, particularly at high speeds of reciprocation, to limit the stroke of the pistons and avoid mechanical impact of the latter with the respective cylinder end walls. With the valve means of the present invention stroke limitation may be achieved by means of adjustable abutment members or the like through which the valve means are operated when the pistons reach the ends of their effective stroke. The stop members may be screw-threaded for adjustment by means of a screwdriver or the like and provided with lock nuts by which they are locked in an adjusted position.

When the valve member is spring operated it may be slidably mounted on a valve spindle which is engaged by the pistons or members associated therewith to change-over the valve, the valve member floating between the operating springs which engage spring abutments on the spindle. One of the spring abutments may be adjustable to form one of said abutment members such adjustment acting in effect to move the "floating" position of the valve member on the spindle. The other adjustable abutment member may be movable with the pistons and arranged to engage the end of the valve spindle.

Figure 5:
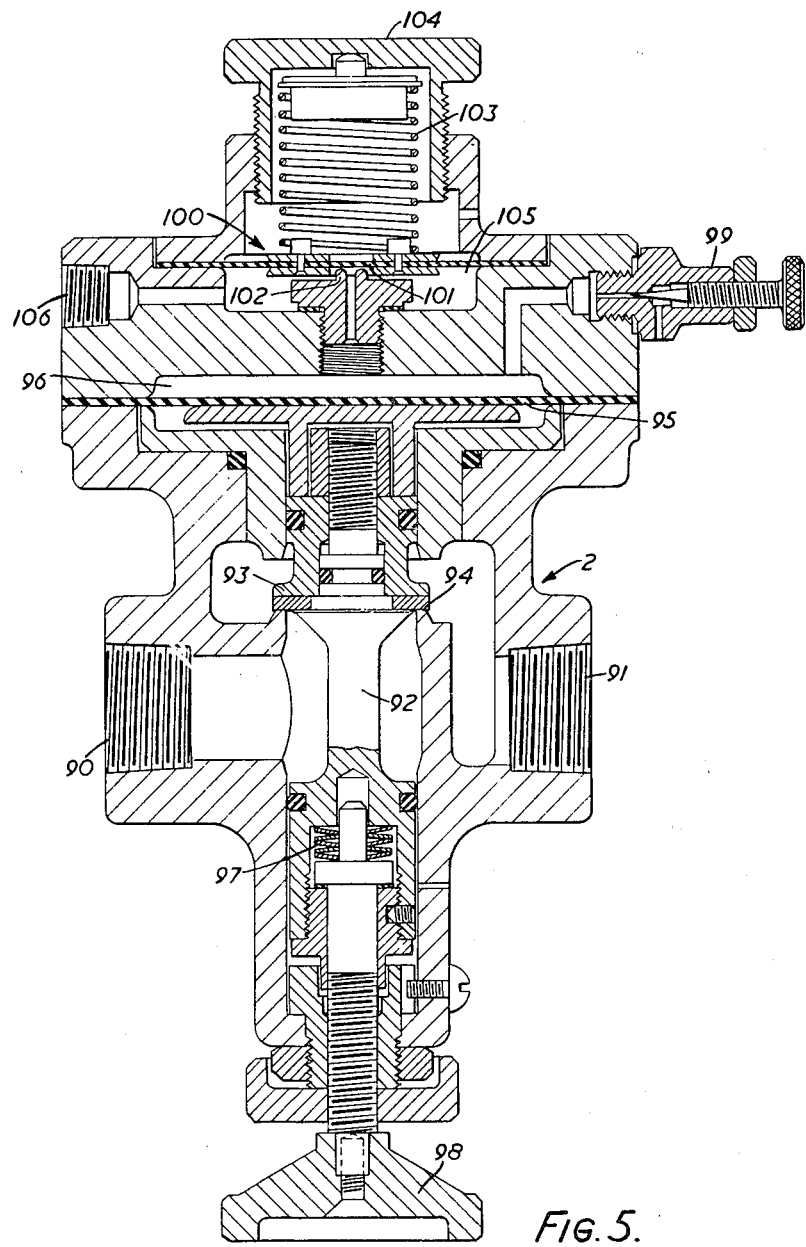

The invention will now be further described with reference to the accompanying drawings which illustrate, by way of example, a free-piston type compressor and motor installation in accordance with the invention. In the drawings:

FIGURE 1 is a block diagram of the installation,
FIGURE 2 is a side view of a compressor stand thereof,
FIGURE 3 is a front view thereof mainly in section on the line III—III in FIGURE 2,
FIGURE 4 is an axial sectional view of a compressor and motor unit of the installation, and
FIGURE 5 is an axial sectional view of a regulator valve of the installation.

The installation is designed to run on sour gas from an oil well to provide a supply of clean compressed air for instrumentation purposes. Referring to the block diagram of FIGURE 1, the supply of sour gas at 1 is connected through a pressure regulator valve 2 and a preheater aftercooler chamber 3 to the motor 4 of the motor and compressor unit 5. The motor 4 exhausts to atmosphere at 6. The compressor 7 of the unit 5 takes in atmospheric air through a suction filter 8 and delivers the air under pressure through a heat exchange coil 9 in the chamber 3 to a pressure storage reservoir 10. The pressure air for instrument operation is taken from the reservoir through a supply pipe 12.

The regulator valve 2 controls the supply of the sour gas to the chamber 3 and hence to the motor 4 in a manner which will be described in detail hereinafter, and it will be noted that a line 13 supplies the compressor output pressure to the valve 2; it is this output pressure which controls the admission of sour gas to the chamber 3. In the chamber 3 the sour gas is preheated before admission to the motor 4 and the compressed air is correspondingly cooled before entering the reservoir 10.

The compressor stand shown in detail in FIGURES 2 and 3 has a hollow base forming the chamber 3 and to which the regulator valve 2 is fitted. On the base 3 is supported the compressed air reservoir 10 which is of upright cylindrical form. The lower end of the reservoir 10 is closed by the base 3 and the upper end is closed by the body of the suction filter 8 which, as shown in FIGURE 3, has a replaceable filter element 14. The unit 5 is mounted along side the reservoir 10, being supported thereon by a projecting mounting bracket 15. A motor inlet pipe 16 connects the chamber 3 to the motor 4, and a compressor outlet pipe 17 connects the compressor 7 to the reservoir 10 through a passage 18 in the filter body 8 and the heat exchange coil 9 within the chamber 3.

The motor and compressor unit 5 is shown in detail in the sectional view of FIGURE 4, and comprises compressor and motor cylinders 20 and 21 coaxially arranged in line. The ratio of the effective areas of compressor and motor pistons 22 and 23, which are slidable in the cylinders 20 and 21, is determined according to the maximum desired ratio of the sour gas supply pressure and the required delivered air pressure, with an allowance to compensate for frictional losses and to leave a reasonable margin of unused capacity in hand.

A hollow tubular piston rod 24 interconnects the pistons 22 and 23 and passes through a sealing gland arrangement 25 positioned between the cylinders 20 and 21 in a gland housing 26 which is flanged for bolting to the mounting bracket 15. The gland arrangement 25 comprises a counterbored tubular body 27 which surrounds the piston rod 24 and within the counterbore of which are positioned opposed multiple chevron-type seals 28. The gland body 27 is fully floating so that it is self-aligning with respect to the piston rod 24, and a spring 29 which retains the seals 28 in the gland body 27 also urges the latter towards an inner end wall 30 of the compressor cylinder 20 relatively to which it is sealed by an O ring 32.

The inner end of the gland body 27 is sealed relatively to the wall of the housing 26 by a lip-type annular resilient seal 33, and the space between the two chevron seals 28 is vented to atmosphere through bores 34 and 35 formed respectively in the body 27 and housing 26. The illustrated gland arrangement effectively prevents sour gas from the motor section leaking into the compressor section of the unit 5 and hence prevents contamination of the compressed air. For intrumentation purposes it is particularly important that contamination of the compressed air should be avoided.

Piston rings 36 for the pistons 22 and 23, and the seals 28, are manufactured from materials which have low-friction properties and enable the unit to operate without maintenance or lubrication for long periods of continuous service. The rate of reciprocation of the unit 5 depends upon the difference between the pressures in the chamber 3 and reservoir 10, and the unit only operates when actually supplying air to the reservoir 10 and no off-loaded or free-running periods occur.

The unit 5 is mounted as illustrated with the cylinder axis vertical, and control valve means mounted at the lower or outer end of the motor cylinder 21 comprise a valve member 37 of poppet type with two spaced poppet portions 38 and 39. Each of the portions 38 and 39 is movable between two associated seatings formed in a valve body 40 attached to the motor cylinder 21, and it seats alternatively against such seatings. The valve member 37 has a through bore by which it is slidably mounted on a vertical valve spindle 42 on which it floats between two operating springs 43 and 44. A stepped collar 45 on the spindle 42 provides an upper spring abutment which is fixed relatively to the spindle, and a stepped sleeve 46 threaded on the lower end of the spindle 42 provides an adjustable lower spring abutment member which is locked in position by a lock nut 47.

The upper end of the spindle 42 projects into the hollow piston rod 24 through a lower bearing sleeve 48 fixed in the lower end of the rod 25, and a cylindrical abutment member 49 fixed to the upper end of the spindle 42 slides within the rod 24. The member 49 is engaged either by the sleeve 48 or an adjustable abutment member 50 fixed in the upper end of the rod 24 at each terminal position of the piston assembly, and such engagement initiates change-over of the valve member 37.

The abutment member 50 is threaded into a fixed sleeve 52 at the upper end of the rod 24 and a screwdriver slot 53 is accessible through a removable cap 54 screwed into the upper end wall 55 of the cylinder 20. This enables the position of the member 50 within the rod 24 to be adjusted, after which it is locked in position by a lock nut 56. This adjusts one valve change-over position, and the other change-over position is adjusted by turning the spindle 42 by means of a lower end screwdriver slot 57 which is in like manner accessible through a removable cap 58 screwed into the valve body 40. The latter adjustment alters the position of the abutment member 46 on the spindle 42 and hence the central "floating" position of the valve member 37 thereon, the member 46 being locked in position by the lock nut 47.

The lower end wall 59 of the cylinder 21 has a central aperture 60 forming a motor inlet and an exhaust port and through which the spindle 42 projects, and an upper end port 62 of the cylinder 21 connects through an external connection 63 with a valve chamber 64 in the valve body 40 intermediate the two pairs of valve seatings. An exhaust connection 65 communicates with an exhaust chamber 66 in the body 40 within which the lower two seatings are formed, and an inlet connection 67 for the sour gas communicates with an inlet chamber 68 within which the upper two valve seatings are formed. Thus the poppet portions 38 and 39 are respectively contained and move in the inlet and exhaust valve chambers 66 and 68.

The valve member 37 is as shown formed in sections between which an annular resilient sealing ring 69 is clamped defining the sealing surfaces of the upper poppet portion 39, this ring being arranged for resilient sealing engagement with either of the two upper or inlet seatings. At its ends the lower poppet portion 38 is formed with machined sealing faces, and the corresponding lower or exhaust seatings are respectively provided by two further annular resilient sealing rings 70 and 71 clamped in position within the body 40. The body 40 has three removable annular sections 72, 73 and 74 attached to the main body portion by a ring of screws 75. The portion 72 provides the lower inlet seating and is sealed relatively to the main body portion by an O ring 76, and the section 74 is similarly sealed by an O ring 77. The sealing ring 70 is clamped between the sections 72 and 73 and the sealing ring 71 is clamped between the sections 73 and 74, the section 72 seating on a shoulder 78 in the main body section.

The valve member 37 has a through passage 79 and the effective cross-sectional area of the exhaust seatings provided by the rings 70 and 71 is less than that of the inlet seatings associated with the poppet portion 39, so that in use a pressure differential across the valve member 37 biases the latter in a manner to be described. The motor 4 is double-acting and the mode of operation is as follows:

In FIGURE 4 the piston 23 is just commencing a downward power stroke, gas pressure being admitted to the upper end of the cylinder 21 through the port 62 with the inlet chamber 68 in communication with the valve chamber 64 as shown in FIGURE 4. The lower end of the cylinder 21 exhausts through the valve member 37 and past the lower sealing ring 71 into the exhaust chamber 66. The differential pressure resulting from the different effective areas of the poppet portions 38 and 39 retains the valve member 37 in the illustrated upper position against any frictional force resulting from the relative movement of the rod 24 and the spindle 42.

When the piston 23 approaches the lower end of its stroke the member 50 engages the member 49 to displace the spindle 42 downwardly and compress the spring 43 which applies a downward force to the valve member 37, and when this spring force overcomes the differential pressure force the valve member 37 changes-over to the lower terminal valve position. As a result the inlet chamber 68 is placed in direct communication with the lower motor port 60 past the sealing ring 69 to produce an upward power stroke of the piston 23; the upper end of the cylinder 21 now exhausts past the sealing ring 70 with the valve member 35 in the lower terminal position. The differential pressure force on the valve member 37 again acts to retain it in the terminal position.

When the piston 23 approaches the upper end of its stroke the sleeve 48 engages the member 49 to compress the spring 44, and again valve change-over occurs when the force of the spring 44 overcomes the differential pressure force on the valve member 37, thus initiating a downward piston stroke.

The differential area of the poppet portions 38 and 39 is designed so that full flow conditions provide a sufficient differential force to ensure reliable valve operation, and the initial compression of the spring 43 or 44 at the commencement of a piston stroke provides a resilient force holding the valve member in the corresponding terminal position and retaining it in that position until pressure conditions are sufficient to provide the necessary bias for the valve.

Reciprocation of the piston 23 in the manner described produces corresponding reciprocation of the compressor piston 22, and at each end the cylinder 20 is provided with an outlet port 80 and an inlet port 81. Thus the compressor is also double-acting, the corresponding ports being controlled by automatic outlet valve 82 supplying a pressure chamber 83, and by automatic inlet valves 84 communicating with an induction chamber 85. The chamber 85 is supplied through the pipe 17 and the pressure chamber 83 is connected to the passage 18 in the filter body 8.

If the unit 5 were free-running the outlet pressure would automatically build up to a value dependent upon the ratio of the piston areas and the sour gas pressure, and the sour gas supply is controlled in an accurate and sensitive manner by the regulator valve 2 to enable the pressure in the reservoir 10 to be controlled at any desired value below the maximum or free-running pressure. The valve 2 has a sour gas inlet 90 and a gas outlet 91 connected to the chamber 3.

The communication between the inlet 90 and oulet 91 is controlled by a valve member 92 which is shown in FIGURE 5 in the closed position in which a poppet portion 93 engages a seating 94. Valve operation is controlled by a flexible diaphragm 95, the pressure in a diaphragm chamber 96 urging the diaphragm and hence the valve member 92 downwardly to the closed position against the opening force of a spring 97. The spring force can be adjusted and preset by means of an external handle 98 to vary the valve operating pressure.

The diaphragm chamber 96 exhausts to atmosphere through an adjustable needle valve 99 and is supplied through a relay valve 100 incorporating a flexible diaphragm 101 arranged for sealing engagement with a projecting annular seating 102. The diaphragm 101 is shown in the closed position in FIGURE 5, and it is urged to this position by a spring 103 which can be adjusted by screwing an end cap 104, which forms a spring abutment, into and out of the valve body. A diaphragm chamber 105 which surrounds the seating 102 communicates with a connection 106 which is connected to the line 13, so that the pressure in the reservoir 10 is supplied to the chamber 105 and acts to lift the diaphragm 101 against the spring 103.

Thus the degree of opening of the valve member 92 depends upon the pressure in the chamber 96, which in turn depends upon the rate at which air enters the chamber 96 in relation to the rate at which it bleeds to atmosphere through the preset needle valve 99. The diaphragm 101 and seating 102 act in a manner somewhat analogous to a nozzle and flapper arrangement, the diaphragm 101 throttling the port within the seating 102 so that small variations in the pressure in the reservoir 10 result in correspondingly large movements of the valve member 92 controlling the supply of sour gas to the motor 4 by virtue of the changing pressure in the chamber 3. As already mentioned, adjustment of the spring 97 controls the regulated output pressure, and adjustment of the spring 103 and the needle valve 99 controls the sensitivity and response of the valve.

As an example of the sensitivity obtainable with the valve construction illustrated, in one particular combination of settings movement of the valve member 92 between the fully open and fully closed positions corresponds to a pressure range of 3 to 15 lbs. per square inch in the diaphragm chamber 96. This pressure range in the chamber 96 is obtained by a variation of plus or minus 0.25 lb. per square inch of the desired air pressure in the reservoir 10. Thus the small variation in the delivery air pressure corresponds to the full range of operation of the regulator valve 2 between the valve closed and valve fully open conditions.

The illustrated arrangement has been described as operated by sour petroleum gas, from an oil well, but it will be appreciated that petroleum gas generally and the output of a gas well could equally be used. When the condition of the gas is such that icing and hydrate formation are a possibility it may be found desirable to construct and arrange the motor so that it is fed from the highest available steady pressure. To this end where practicable the control valve 2 may, as a modification of the described arrangement, be sited downstream of the motor.

With the foregoing modification the temperature drop across the motor exhaust valve, due to expansion of the gas at the valve, will be minimized. It may be equally desirable that the effective working pressure ratios of the motor and compressor should be such that the motor will operate on the lowest practical pressure differential (say one to two atmospheres) unless conditions of high temperature and/or dry input gas prevail.

I claim:
1. A fluid-pressure operated reciprocating motor comprising a cylinder, a piston receiprocable in the cylinder, and control valve means comprising a poppet valve member with two spaced poppet portions, a valve spindle on which said valve member is mounted and which is movable by said piston to change over the valve means, two opposed valve seatings between which one of said poppet portions is movable and against which that portion alternatively seats, and two further opposed seatings between which the other of said poppet portions is movable and against which the latter portion alternatively seats, both said poppet portions seating together to control the inlet and exhaust flows through the valve means from said cylinder.

2. A motor according to claim 1, wherein the effective area of the two seatings associated with said one poppet portion is different from the effective cross-sectional area of the two further seatings associated with the other poppet portion, so that in use a force differential is produced which biases the valve member.

3. A motor according to claim 2, wherein the flow through the valve is arranged in use to be such that in each terminal position of the valve member the differential bias urges it to and retains it in that position until the valve changes-over at or near the end of the corresponding piston stroke.

4. A motor according to claim 1, wherein resilient valve sealing rings are used.

5. A motor according to claim 4, wherein resilient valve sealing rings are used with each poppet portion.

6. A motor according to claim 5, wherein said one poppet portion has two resilient rings for sealing engagement respectively with the two associated seatings, and the two further seatings are provided with resilient rings for sealing engagement with the other poppet portion.

7. A fluid-pressure operated reciprocating motor comprising a cylinder; a piston reciprocable in the cylinder; and control valve means comprising a poppet valve member with two spaced poppet portions, two opposed seatings between which one of said poppet portions is movable and against which that portion alternatively seats, two further opposed seatings between which the other of said poppet portions is movable and against which said other portion alternatively seats, both said poppet portions seating together to control the inlet and exhaust flows through the valve means from the cylinder and the effective cross-sectional area of the two seatings associated with said one portion being different from the effective cross-sectional area of said two further seatings so that in use a force differential is produced which biases the valve member; and mechanical valve operating means including a valve spindle on which the valve member is slidably mounted, the spindle being displaceable by the piston to change over the valve member, a spring through which a valve operating force is applied to the valve member from the spindle and the compression of which is sufficient to move the valve member against said bias and to hold the member in a new terminal position until pressure conditions have built-up to provide the necessary holding bias in the opposite direction.

8. A motor according to claim 7, wherein said valve operating means further comprise abutment members at least one of which is mounted on the valve spindle, and through which the valve means are operated when the motor piston reaches the ends of its effective stroke and which are adjustable for the purpose of stroke limitation.

9. A motor according to claim 8, wherein the abutment members have a screw-thread adjustment.

10. A motor according to claim 7, wherein the valve member floats between two operating springs which respectively engage spring abutments on the spindle.

11. A motor according to claim 10, wherein one of the spring abutments is adjustable along the valve spindle.

12. A motor according to claim 11, wherein the other of said adjustable abutment members is movable with the motor piston and arranged to engage the end of the valve spindle.

13. A motor according to claim 12, forming the motor section of a free-running motor and compressor unit.

14. A motor and compressor unit according to claim 13, wherein the motor is connected to a chamber which in use contains the gaseous operating fluid.

15. A motor and compressor unit according to claim 14, wherein the compressor outlet is connected to a heat exchange pipe which passes through said chamber which thus forms a preheater and aftercooler.

16. A motor and compressor unit according to claim 14, wherein a regulator valve responsive to compressor output pressure controls the admission or exit of the gaseous operating fluid to or from said chamber.

17. A motor and compressor unit according to claim 16, wherein the regulator valve is a relay diaphragm valve.

References Cited by the Examiner

UNITED STATES PATENTS

| | | | |
|---|---|---|---|
| 884,131 | 4/88 | Compton | 230—52 |
| 1,144,641 | 6/15 | Confort | 230—52 |
| 2,597,443 | 5/52 | Broughton | 91—342 |
| 3,021,823 | 2/63 | Dinkelkamp | 91—342 |

LAURENCE V. EFNER, *Primary Examiner.*

ROBERT M. WALKER, *Examiner.*